United States Patent [19]
LaCava et al.

[11] Patent Number: 5,487,775
[45] Date of Patent: Jan. 30, 1996

[54] CONTINUOUS PRESSURE DIFFERENCE DRIVEN ADSORPTION PROCESS

[75] Inventors: Alberto LaCava, South Plainfield, N.J.; Kevin McKeigue, New York, N.Y.

[73] Assignee: The BOC Group, Inc., New Providence, N.J.

[21] Appl. No.: 240,048

[22] Filed: May 9, 1994

[51] Int. Cl.$^6$ .............................................. B01D 53/047
[52] U.S. Cl. ........................... 95/98; 95/107; 95/113; 95/130; 96/125; 96/133
[58] Field of Search ............... 95/96–105, 107, 95/113, 130; 96/124, 125, 133, 144, 150

[56] References Cited

U.S. PATENT DOCUMENTS

| | | | |
|---|---|---|---|
| Re. 29,941 | 3/1979 | Bird | 95/98 X |
| 2,877,861 | 3/1959 | Miller | 95/113 |
| 3,080,692 | 3/1963 | Staley et al. | 95/113 X |
| 3,201,921 | 8/1965 | Heyes | 95/113 X |
| 3,231,492 | 1/1966 | Stine et al. | 96/124 X |
| 4,000,990 | 1/1977 | Bingham | 95/103 |
| 4,299,596 | 11/1981 | Benkmann | 95/100 |
| 4,519,813 | 5/1985 | Hagiwara et al. | 95/130 X |
| 4,612,022 | 9/1986 | Berry | 95/113 |
| 4,711,646 | 12/1987 | Acharya et al. | 95/95 |
| 4,812,147 | 3/1989 | BeVier | 95/95 |
| 5,112,367 | 5/1992 | Hill | 95/98 |
| 5,133,784 | 7/1992 | Boudet et al. | 95/100 |
| 5,246,676 | 9/1993 | Hay | 423/219 |
| 5,268,021 | 12/1993 | Hill et al. | 95/98 |

FOREIGN PATENT DOCUMENTS

| | | | |
|---|---|---|---|
| 0703491 | 2/1965 | Canada | 95/130 |
| 0122874 | 10/1984 | European Pat. Off. | 95/130 |
| 54-138868 | 10/1979 | Japan | 95/113 |
| 55-024517 | 2/1980 | Japan | 95/103 |
| 60-127202 | 7/1985 | Japan | 95/130 |
| 1-018906 | 1/1989 | Japan | 95/130 |
| 2033777 | 5/1980 | United Kingdom | 96/124 |

*Primary Examiner*—Robert Spitzer
*Attorney, Agent, or Firm*—David M. Rosenblum; Larry R. Cassett

[57] ABSTRACT

A continuous pressure driven adsorption process for separating a multi-component gaseous mixture. In accordance with the method, the multi-component gaseous mixture is passed through a first portion of the adsorbent to adsorb one or more preferentially adsorbed components while a second portion of the adsorbent is regenerated. The multi-component mixture is passed through the first portion of the adsorbent in sections and the second portion of the adsorbent is regenerated in sections. The sections forming the first portion of the adsorbent become successively less saturated and the sections forming the second portion of the adsorbent becomes successively more concentrated in the more preferentially adsorbed component. A product stream is expelled from the less saturated section of the first portion of the adsorbent. The product stream is enriched in the less preferentially adsorbed component(s). Masses of adsorbent are continually being shifted between the first and second portions of the adsorbent so that the mass of adsorbent forming the regenerated section is shifted to the first portion of the adsorbent and used to form the least saturated section. The mass of adsorbent forming the most saturated of the sections is shifted to the second portion of the adsorbent and used to form the non-regenerated section. The masses are shifted at a sufficiently high frequency to maintain the sections forming the first and second portions of the adsorbent in their successively less saturated and successively more concentrated states.

15 Claims, 9 Drawing Sheets

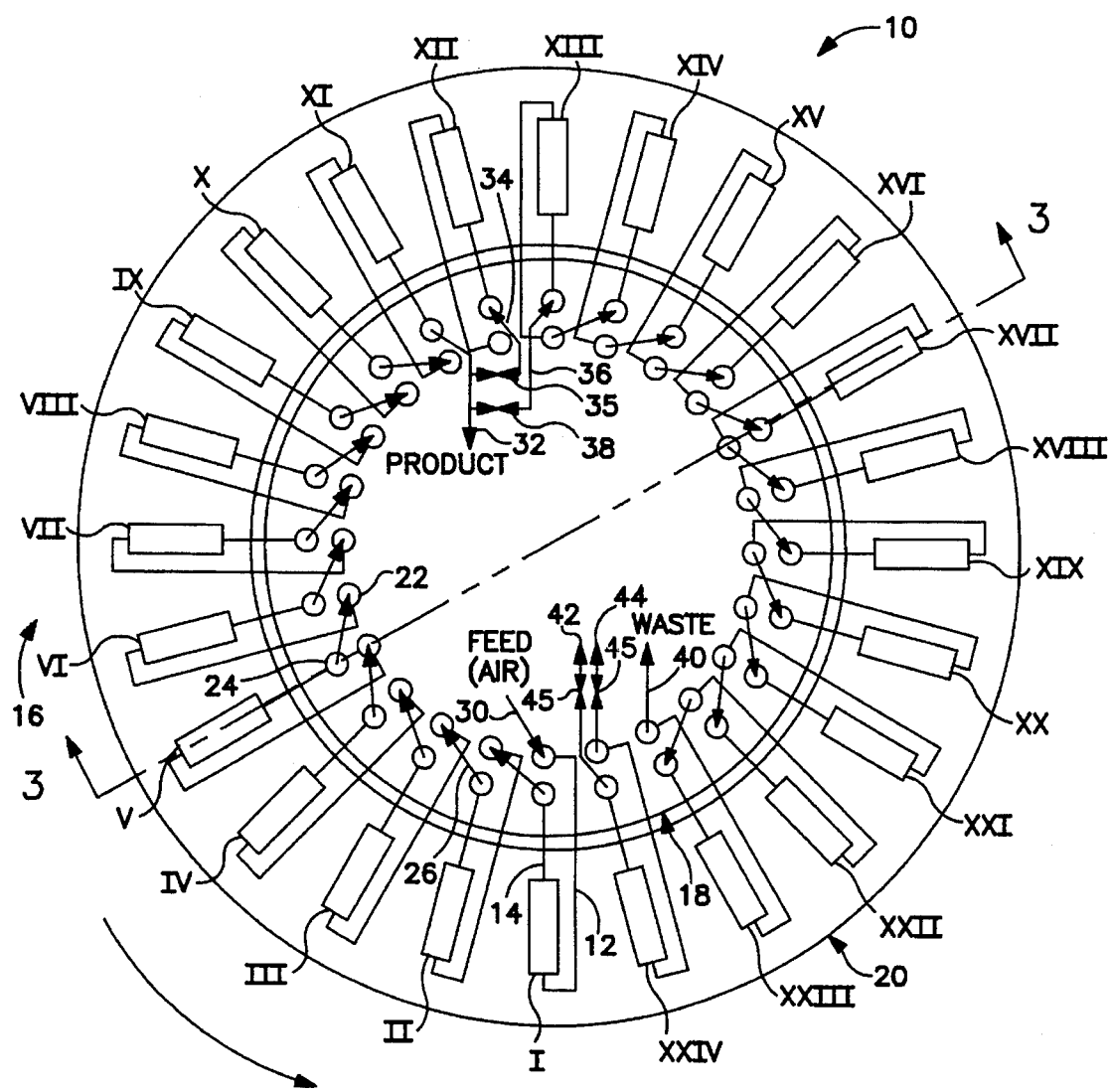
FIG. IA

CONTINUOUS PRESSURE DIFFERENCE DRIVEN ADSORPTION PROCESS

BACKGROUND OF THE INVENTION

The present invention relates to a pressure difference driven adsorption process in which a more preferentially adsorbed component of a gaseous mixture is adsorbed in an adsorbent under pressure to rectify the gaseous mixture. The adsorbent is regenerated by subjecting the adsorbent to a sufficiently low partial pressure of the more preferentially adsorbed component of the gaseous mixture. More particularly, the present invention relates to such a method in which the adsorbent is divided into two portions and each portion is subdivided into serially-connected sections to more efficiently utilize the adsorbent.

A common pressure difference driven adsorption process is pressure swing adsorption in which two or more beds are employed in an out of phase relationship so that an on-line bed adsorbs a more preferentially adsorbed component of a mixture to be separated while an off-line bed is being regenerated. Such processes have wide spread application to the separation of atmospheric gases. In such an application, each of the beds has an adsorbent formed of molecular sieve material designed to more preferably adsorb either oxygen or nitrogen. The air is passed into the on-line bed where for instance, nitrogen is adsorbed to produce a product stream highly enriched in oxygen. Since air, by in large, contains oxygen and nitrogen, the product stream can contain oxygen with small amounts of argon and trace amounts of other elements. A point is reached at which the adsorbent becomes saturated with the more preferentially adsorbed component and therefore must be regenerated. At this point, the on-line bed is brought off-line and the previously regenerated off-line bed is brought on-line. The previous on-line bed is vented to atmosphere and then subjected to a sufficiently low partial pressure of the more preferentially adsorbed component of the mixture. This causes desorption of the more preferentially adsorbed component from the adsorbent bed. Thereafter, just prior to the off-line bed being brought on-line, it is backfilled with the product stream so as to be slowly brought up to operating pressure.

A common problem that is encountered in conducting a pressure driven adsorption process is that the portion of the bed at which the mixture to be separated enters becomes saturated rather quickly, while an opposite portion of the bed, through which the product stream is expelled, is never fully saturated. As a result, a large mass of the adsorbent must be used if extremely high purities are to be achieved. As will be discussed the present invention solves this problem by utilizing the adsorbent in a more efficient manner so that high purity product streams can be produced while using a lower amount of adsorbent as compared with the amount of adsorbent that would have to be used in an equivalent prior art process.

SUMMARY OF THE INVENTION

The present invention provides a method of separating a multi-component gaseous mixture. In accordance with the method, the multi-component gaseous mixture is passed through a first portion of an adsorbent at a sufficiently high pressure to adsorb at least one more preferentially adsorbed component of the multi-component gaseous mixture. A second portion of the adsorbent is re-generated at a sufficiently low partial pressure of the at least one more preferentially adsorbed component to desorb the at least one more preferentially adsorbed component from the adsorbent. The multi-component gaseous mixture is passed through the first portion of the adsorbent and the second portion of the adsorbent is subjected to the sufficiently low partial pressure in discrete sections of the adsorbent making up the first and second portions of the adsorbent. As a result, the sections forming the first portion of the adsorbent become successively less saturated with the at least one more preferentially adsorbed component as the multi-component mixture passes through the first portion of the adsorbent to form most and least saturated sections. Also the sections forming the second portion of the adsorbent become successively more concentrated in the at least one more preferentially adsorbed component to form regenerated and non-regenerated sections. A product stream enriched with at least one less preferentially adsorbed component of the multi-component mixture is expelled from the least saturated section. Masses of the adsorbent are continuously and simultaneously shifted between the first and second portions of the adsorbent so that the adsorbent forming the regenerated section is shifted to the first portion of the adsorbent and is used to form the least saturated section. The adsorbent forming the most saturated section is shifted from the first portion of the adsorbent to the second portion of the adsorbent and is used to form the non-regenerated section. The continual and simultaneous shifting of the masses of the adsorbent occurs at a sufficient frequency to maintain the sections forming the first and second portions of the adsorbent successively less saturated and successively more saturated respectively in the more preferentially adsorbed component.

It is to be noted that the term "successively less saturated", means herein and in the claims that as between any two of the sections, a section will be less saturated than a next, downstream section. Similarly, the term "successively more concentrated", means herein and in the claims that as between any two of the sections forming the second portion of the adsorbent, a section will have a higher concentration of the more preferentially adsorbed component in its previous upstream section. Additionally, the present invention is directed towards separating one or more of the less preferentially adsorbed components of the mixture by adsorbing one or more of the more preferentially adsorbed components. Hence, the language "at least one" is used in the specification and claims to describe a process in accordance with the present invention.

As will be described herein, the shifting of the masses of adsorbents can either be done physically or by valves or by a combination of both a physical shift of adsorbent and valves or by any other way of partitioning the adsorbent and then shifting the partitions. The sub-dividing of the total amount of the adsorbent utilized, as has been found by the inventors herein, can allow the conduct of a process in which more of the adsorbent will be in a saturated state as compared with subjecting the same mass of adsorbent to adsorption without the sub-division of the present invention. As a result, the adsorbent can be used more efficiently than in the prior art because more product can be produced at a given purity as compared with the amount of adsorbent that would otherwise have been required in prior art, pressure driven, pressure swing adsorption processes.

BRIEF DESCRIPTION OF THE DRAWINGS

While the specification concludes with claims distinctly pointing out the subject matte that Applicants regard as their invention, it is believed that the invention would be better understood when taken in connection with the accompanying drawings in which:

FIG. 1A is a schematic plan view of an apparatus for conducting a process in accordance with the present invention illustrating a particular phase of operation;

DETAILED DESCRIPTION

Figure 1B:
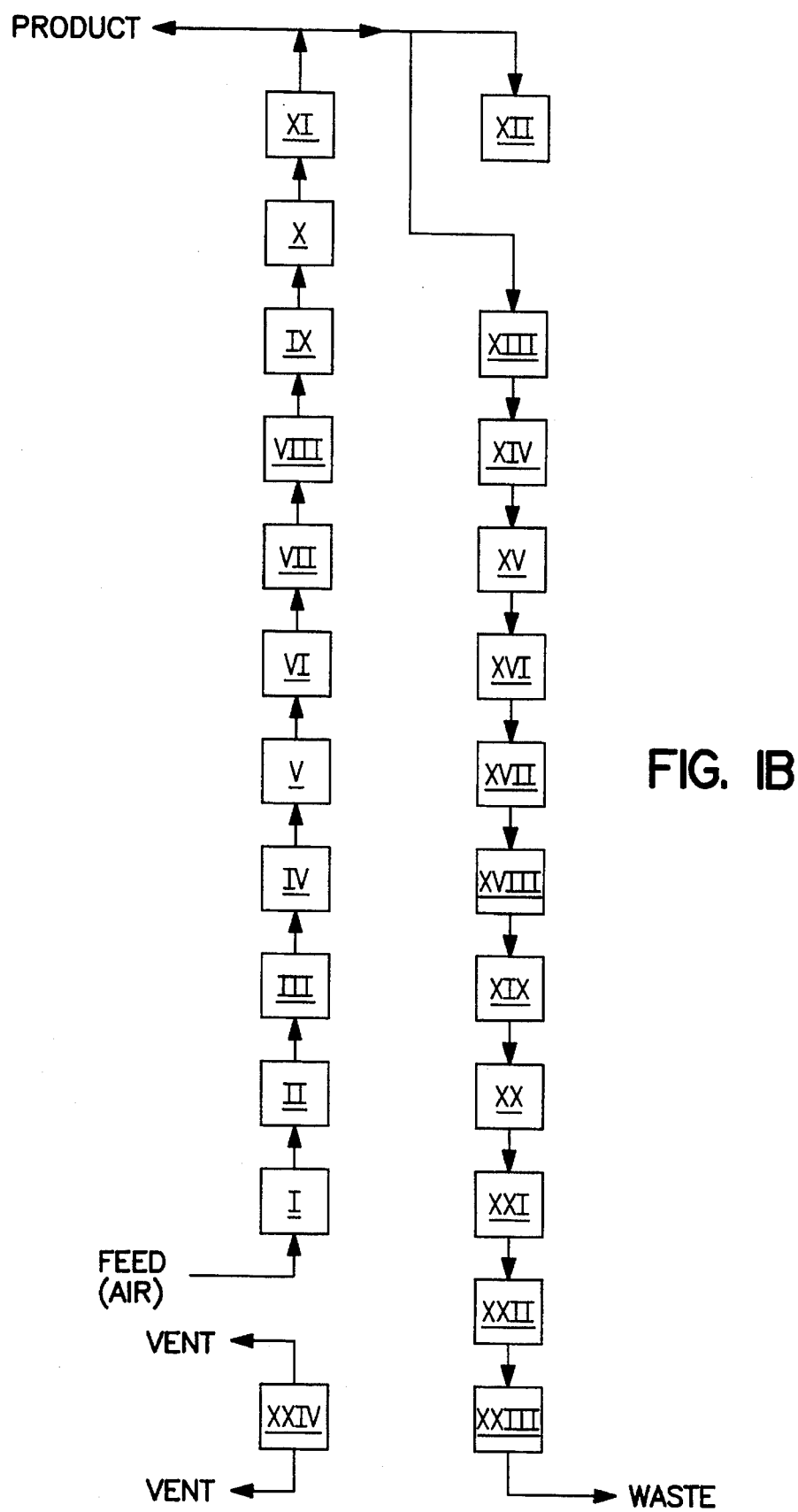
FIG. 1B is a process flow diagram of the apparatus of FIG. 1 illustrating the phase of operation shown in FIG. 1.

With reference to FIGS. 1A and 1B, an apparatus 10 is illustrated for carrying out a method in accordance with the present invention. Apparatus 10 consists of 24 sections of adsorbent, designated by referenced numerals 1-XXIV inclusive, that are in the form of 24 individual adsorbent beds. Each bed has an inlet 12 and outlet 14 (See section I) and contains, for example, Zeolite NaX molecular sieve material to preferentially adsorb nitrogen over oxygen. The beds are mounted on a rotary valve structure 16 having a stationary portion 18 and a rotary portion 20 to which the beds are physically connected. Rotary portion 20 rotates in a counter clockwise direction as indicated by the arrowhead.

As will be discussed, stationary portion 18 is preferably located above rotary portion 20, rather than the one-inside-the-other representation shown in the schematic drawings herein. Pairs of inlet and outlets 12 and 14 associated with each bed or section of adsorbent are in communication with paired inlet and outlet passages 22 and 24 defined within rotary valve 16. (Each pair of inlet and outlet passages 22 and 24 are spaced apart in a radial direction.) Each of inlet and outlet passages 22 and 24 is formed in two portions, one lower portion located within rotary portion 20 and another upper portion located within stationary portion 18. The rotation of rotary portion 20 registers the upper and lower portions of the inlet and outlet passages 22 and 24. The upper portions of inlet and outlet passages 22 and 24 that are located in stationary portion 18 of rotary valve 16 are connected to one another by transfer lines 26 in a staggered relationship so that an upper portion of an outlet passage 24 located within stationary portion 18 communicates with an upper portion of the next adjacent inlet passage 22 located within stationary portion 18 and as viewed in a clockwise direction. The result of such structure is to connect the sections of adsorbent of each portion of adsorbent in series. For instance, feed air flows into inlet 12 of the bed forming section I of the adsorbent and then flows out of outlet 14 thereof, through the two lower and upper portions of outlet 24 formed in rotary and stationary portions 20 and 18, respectively, of rotary valve 16 and then through transfer line 26. Thereafter, the feed flows into the upper and lower portions of inlet 22 of the next pair of inlet and outlets 22 and 24 and then into inlet 12 of the bed forming section II of adsorbent.

As indicated above, in operation sections I–XXIV and rotary portion 20 of rotary valve 16 move counterclockwise. At the instant of time shown in FIGS. 1A and 1B sections I–XI and XXIV form first sections of a first portion of the total adsorbent being used within apparatus 10. At the same time, sections XII through XXIII form a second portion of the total amount of adsorbent that is being utilized within apparatus 10. The first portion of the adsorbent is adsorbing while the second portion is regenerating. Section XXIV, even though not currently adsorbing at the instant of time shown in FIGS. 1A and 1B had been adsorbing and as previously the most saturated of the first sections is in the process of being shifted to the second portion of adsorbent for regeneration. Section XII, which at a time just previous to that shown in FIGS. 1A and 1B was a regenerated section, is illustrated as being transferred from the second to the first portion of adsorbent.

An inlet and an outlet designated by reference numbers 30 and 32, respectively, are provided on stationary portion 18 of rotary valve 16. Air after having been compressed to a pressure slightly above atmospheric pressure enters inlet 30, flows through sections I, II, III, IV, V, VI, VII, VIII, IX, X and XI, and then is expelled from outlet 32 as a product stream. Sections I–XI are connected in series and each section is successively less saturated with nitrogen than the next following, downstream section. For instance, section V is more saturated than section VI which is less saturated than section III and etc. Thus, section I (of the first sections making up the frost portion of adsorbent) will, at the conclusion of the phase of operation of apparatus 10 shown in FIGS. 1A and 1B, become the most saturated of the sections while the less preferentially adsorbed component, oxygen and also possibly argon and etc. are expelled from section XI, the least saturated section of the first portion of the adsorbent. At the same time, section XII is being repressurized or back filled with product through a backfill inlet 34 (connected to a backfill throttle valve 35 used to maintain system pressure) so that section XII is slowly brought up to operating pressure.

Sections XIII–XXIII are being actively regenerated by countercurrently being purged with a purge stream composed of product through purge inlet 36 connected to purge throttle valve 38. Sections XIII–XXIII are being subjected to a low partial pressure of nitrogen by being purged with product so that such sections are successively more concentrated in the more preferentially absorbed component to form a regenerated section. At the completion of the illustrated phase of operation (But directly before the phase of operation next illustrated) section XIII will be the regenerated section and section XXIII will be the non-regenerated section.

A waste stream or possibly a secondary product stream is expelled from the a vent 40 provided within stationary portion 18 of rotary valve 16. Section XXIV is undergoing depressurization by being vented to atmosphere through top and bottom vents 42 and 44 provided within stationary and rotating portions 18 and 20, respectively, of rotary valve 16 to initiate desorption of the more preferentially adsorbed component, in case of apparatus 10, nitrogen. The regeneration of adsorbent could be accelerated by adding vacuum pumps at vent 40 and at vents 42 and 44. In this manner, the portion of adsorbent being regenerated would be regenerated at a sub-atmospheric pressure and the adsorbent being vented would be depressurized to such sub-atmospheric pressure. Each top and bottom vent 42 and 44 is provided with a vent throttle valve 45. As could be appreciated by those skilled in the art, though not generally an advantageous operation, sections of adsorbent could be disadvantageously transferred between portions of adsorbent without intermediate depressurization and repressurization steps.

Figure 2A:
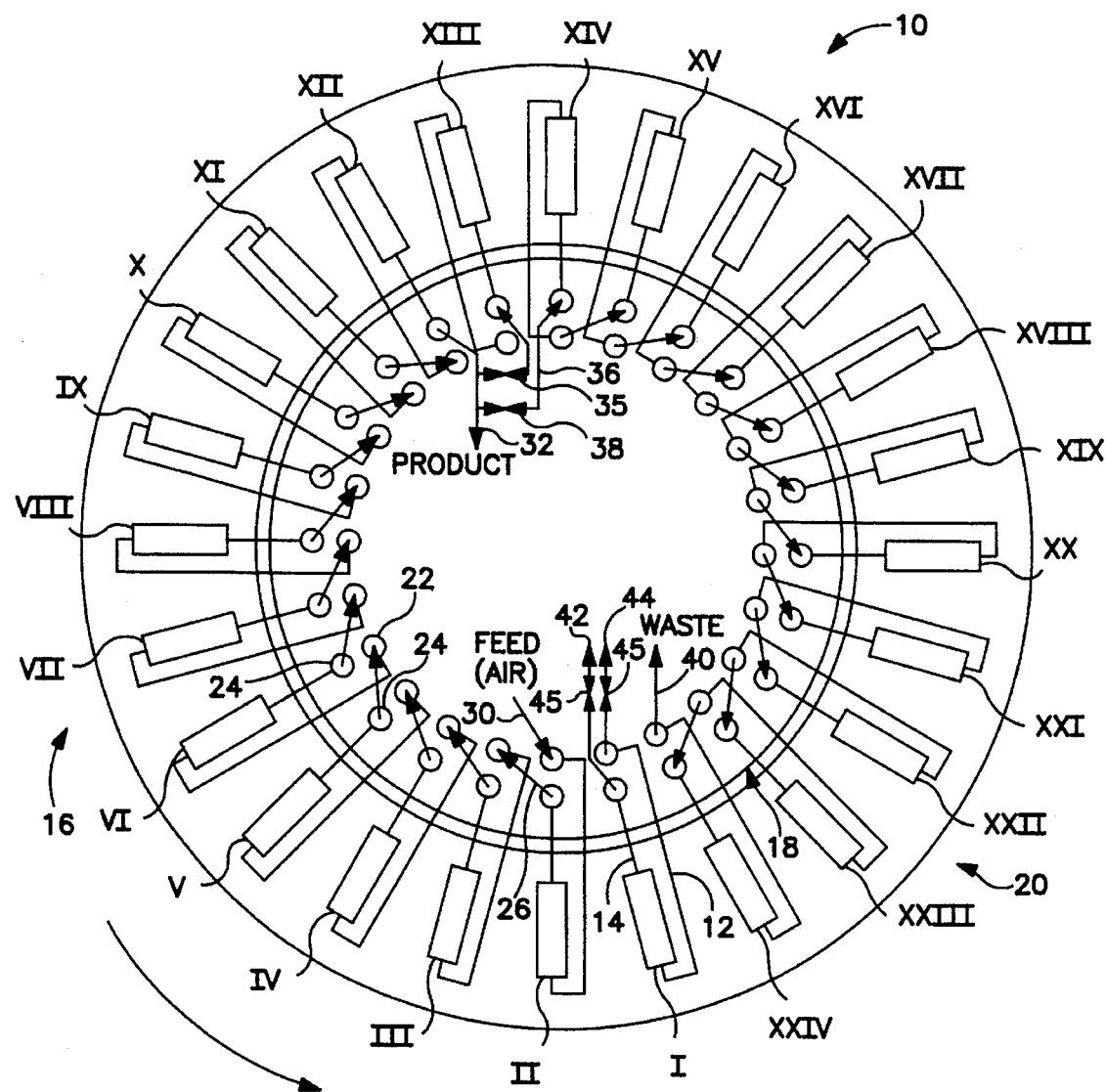
FIG. 2A is a schematic plan view of the apparatus of FIG. 1A showing a phase of operation that directly follows the phase of operation shown in FIG. 1A.
Figure 2B:
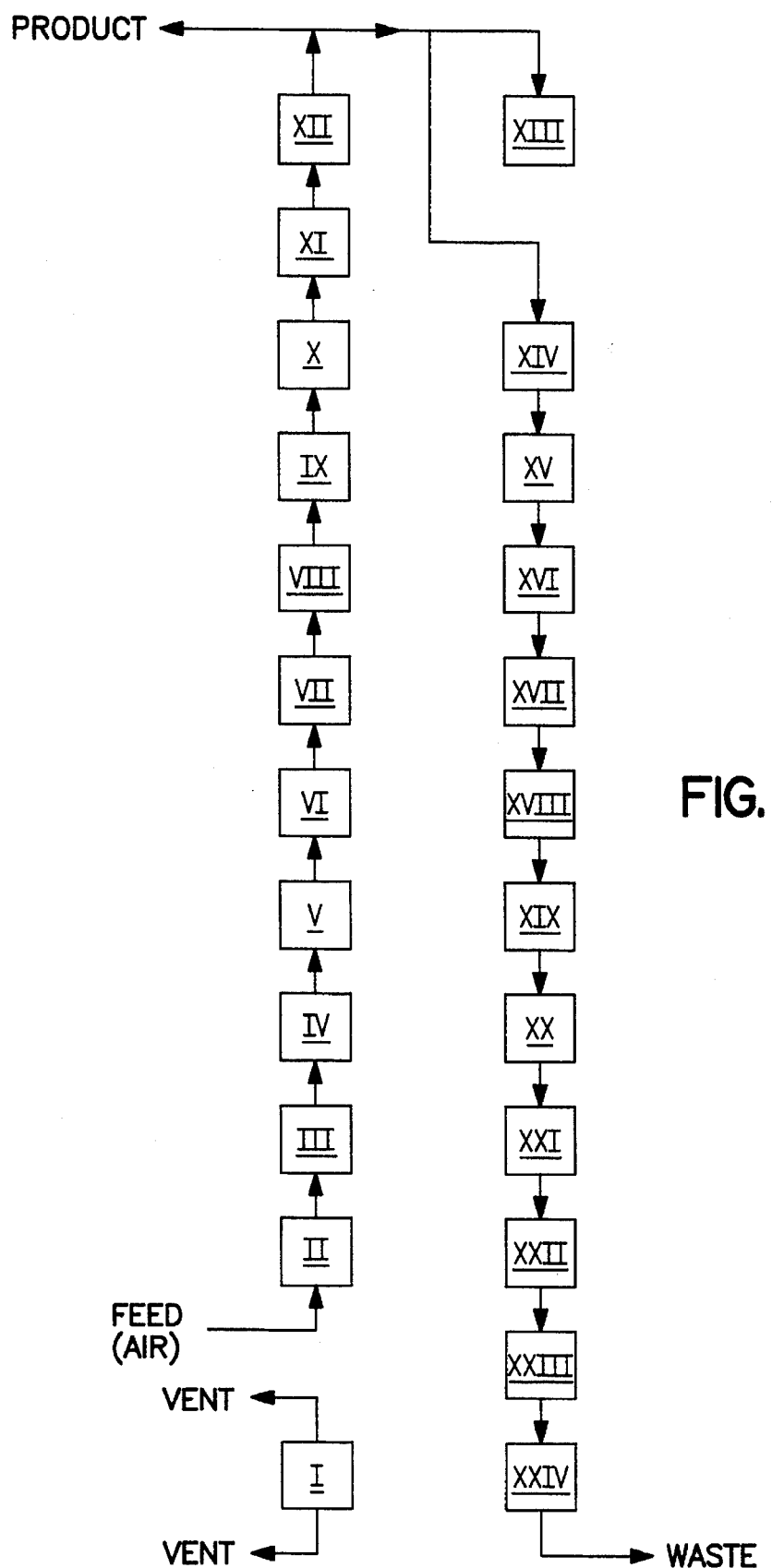
FIG. 2B is a process flow diagram of the apparatus as shown in FIG. 2A illustrating the phase of operation of the apparatus occurring in FIG. 2A.

With reference to FIGS. 2A and 2B, rotary valve and sections I–XXIV have incrementally moved counter clockwise to the next phase of operation. Section XII has now been shifted to the first portion of adsorbent and now is the least saturated section, section XII having been previously regenerated. Section II is now the most saturated section and section XIII is being backfilled with product prior to its being shifted to the first portion of adsorbent. Just prior to the next following phase, section XIV will be a regenerated section while section XXIV will be replaced by section I and section I will be the nonregenerated section of the second portion of adsorbent.

The cycle will continue with the rotation of rotating portion 20 of rotary valve 16 at a speed of rotation that is matched with the size of apparatus 10 and the purity to be achieved. The speed of rotation must be sufficient to create the shifting of masses of adsorbent with a sufficient frequency that the concentration gradients between the most and least saturated of the sections and the regenerated and non-regenerated of the sections is maintained. Tracking section XII, for exemplary purposes, section XII will become more saturated with nitrogen as time progresses. However, since rotary valve 16 is rotating, section XII will shift counterclockwise to replace other sections of adsorbent that have become even more saturated until it is the most saturated section. After being the initial section, to which air is fed, section XII will be transferred over to the second portion of adsorbent to become the non-regenerated section. However, as time progresses, more nitrogen will desorb from section XII and it will become less concentrated in the nitrogen to replace sections that have even a lower concentration of nitrogen or are more regenerated, until it becomes the regenerated section. After regeneration, it is backfilled with product (FIGS. 1A and 1B) and shifted over to the first portion of adsorbent (FIGS. 2A and 2B). Each of the sections of adsorbent will undergo the foregoing operations through rotation of rotary valve 16.

Figure 3:
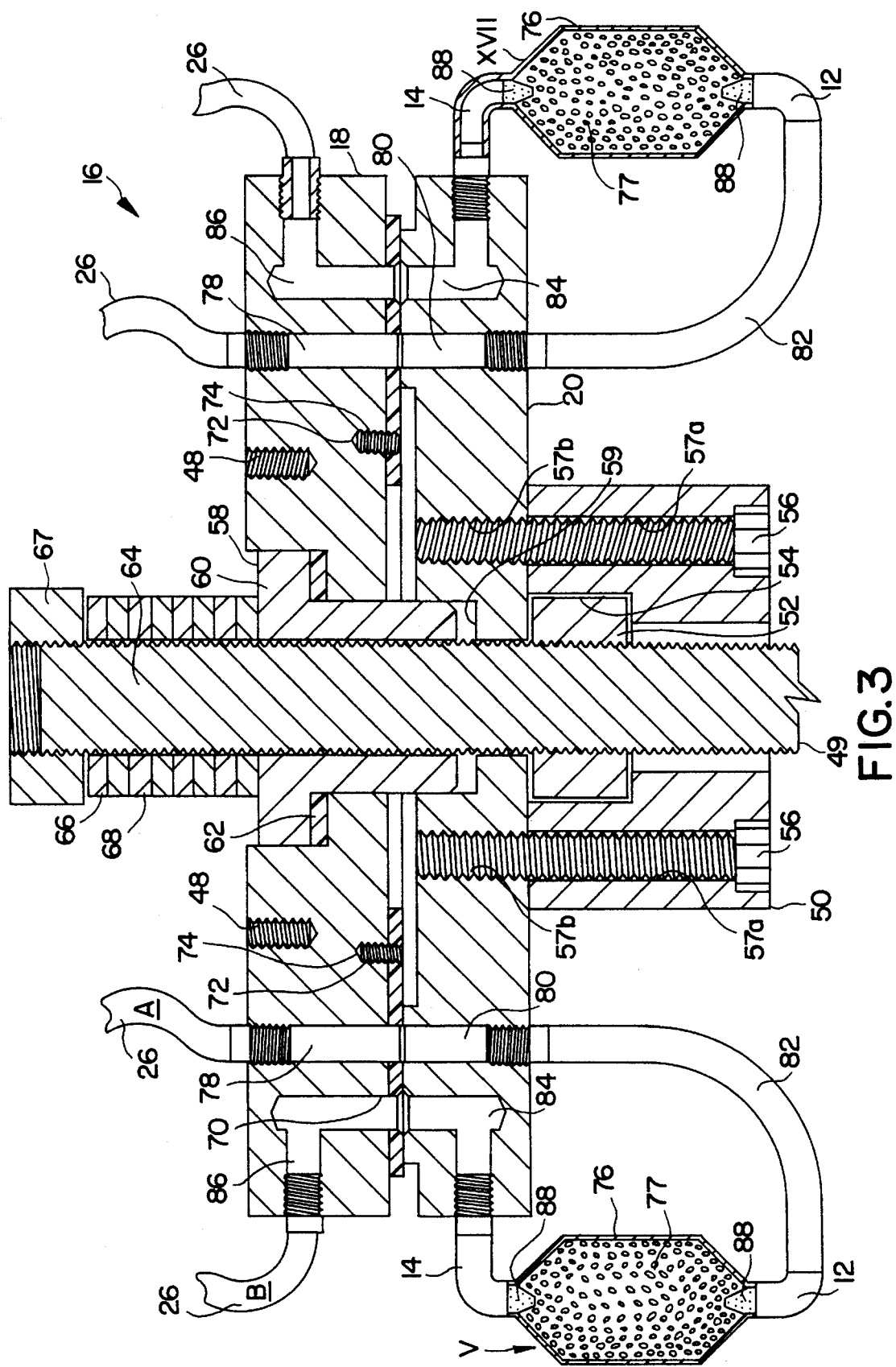
FIG. 3 is a cross sectional view of the apparatus illustrated in FIG. 1A taken through a line 3—3 thereof.

With reference to FIG. 3, stationary portion 18 of rotary valve 16 is held stationary by bolts which are connected to a framework (bolts and framework not illustrated). The bolts are threaded within a radial arrangement of bores 48. A rotating shaft 49 is fitted to a crown piece 50. Rotating shaft 49 has a hexagonal enlargement 52 (a hex-nut threaded to rotating shaft 49 and welded in position) which is seated within a complementary hexagonal recess 54 to prevent relative movement between rotating shaft 49 and crown piece 50. Crown piece 50 is in turn connected to rotary portion 20 of rotary valve 16 by provision of bolts 56 passing through bores 57a and threaded within bores 57b so that rotation of rotating shaft 49 is transmitted to rotating portion 20 of rotary valve 16.

In order to maintain stationary and rotary portions 18 and 20 of rotary valve 16 in alignment, stationary portion 18 of rotary valve 16 is provided with a countersunk bore 58 within which seats within an insert 60. Insert 60 in turn bottoms within an alignment bore 59 defined in rotating portion 20. Lubrication is provided between insert 60 and countersunk bore 58 by provision of a TEFLON bearing 62 of annular configuration. Rotating shaft 49 is further provided with a threaded end portion 64 located above hexagonal enlargement 52 and which passes through insert 60. A washer 66 and a nut, 67, which is threaded onto threaded end portion 64 bear against a stack of Bellville washers 68 to urge stationary and rotary portions 18 and 20 of rotary valve 16 against one another. A seal 70 in the form of an annular gasket, formed of TEFLON, is provided to effect a seal between stationary and rotary portions 18 and 20 of rotary valve 16 while permitting relative rotation without additional lubrication requirements. Seal 70 is held in position by provisions of studs 72 engaged within threaded stud bores 74.

Each section of adsorbent is formed by a bed including a casing 76 containing NaX Zeolite adsorbent 77. Air enters a pair of upper and lower portions 78 and 80 of inlet 22 which are brought into registry with one another by rotation of rotary portion 20 of rotary valve 16. The air then enters inlet transfer line 82, inlet 12 of the relevant section (section V or XVII) and alter adsorption within adsorbent 77, passes out of outlet 14. Alter outlet 14, the air then passes through lower and upper portion 84 and 86 of outlet 24 which are brought into registration with one another by rotation of rotary portion 18 of rotary valve 16. As illustrated, inlet and outlet 12 and 14 of each section is a fitting to a bed, threaded within bed casing 76 and provided with strainers 88 to prevent adsorbent 77 from being expelled from the beds by action of air pressure. Inlet 12 is threadably engaged with a fitting of inlet transfer line 82 which is in mm by provision of another fitting at the other end thereof is threadably engaged with lower inlet transfer port 80.

Each upper portion 86 of outlet 24 is radially aligned with an upper portion 78 of an inlet 22. Transfer lines 26 are each provided with threaded fitting which is threadably engaged within an upper portion 86 of outlet 24 and an upper portion 78 of an inlet 22 in a staggered relationship to provided the series connections between beds or sections of adsorbent 77. In the illustrated section of rotary valve 16 and at the time illustrated section V of adsorbent is being fed from section IV of adsorbent through transfer line 26 which has also been labeled as "A" and bed V of adsorbent is feeding section VI of adsorbent through transfer line 26 which has also been labeled as "B".

Inlet 30 and outlet 32 are formed from an upper portion 78 of an inlet 22 and an upper portion 86 of an outlet 24 which are left unconnected to a transfer line 26. Back fill and purge throttle valves 37 and 38 communicate across relevant upper portions 78 of inlet 22 so that the next section after outlet 32 is subjected to back fill (for instance in FIG. 1A, section XII) while the next following bed (for instance in FIG. 1A, section XIII) is being subjected to purge with product. After vent 40, which is formed from an upper portion 86 of and outlet 24 being left unconnected to a transfer line 26, top and bottom vent valves 42 and 45 are connected to the next upper inlet and outlet portions 78 and 86 of an inlet and outlet 22 and 24 to permit venting of a section (section XXIV in FIG. 1A) to atmosphere.

The rotary valve arrangement allows for alternative embodiments of the subject invention to easily be practiced by appropriate connections and accessories attached to upper portions 78 and 86 of inlets and outlets 22 and 24. In the embodiment discussed above, inlet 30 is separated from outlet 32 by nine pairs of upper portions 78 and 86 of inlets and outlets 22 and 24 and purge throttle valve 34 is separated from low pressure outlet 36 by nine pairs of upper portions 78 and 86 of inlets and outlets 22 and 24 to allow eleven sections of adsorbent to be producing while eleven sections of adsorbent are regenerating. At the same time, the remaining two sections of adsorbent are being backfilled and vented to atmosphere, respectively, during their transfer between the first and second portions of adsorbent.

Figure 4A:
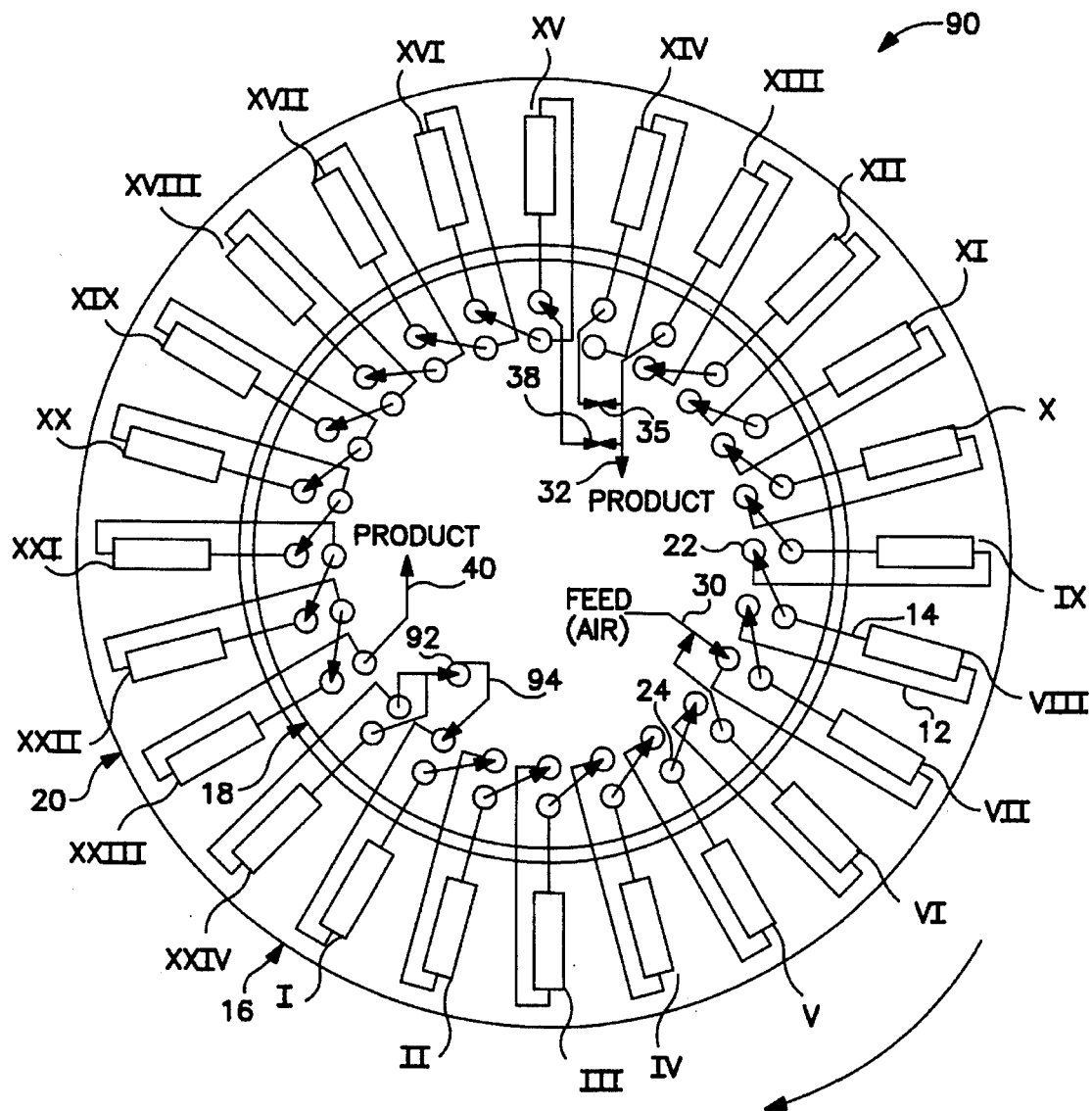
FIG. 4A is a schematic plan view of an alternative embodiment of an apparatus for conducting an alternative embodiment of a process in accordance with the present invention illustrating a particular phase of operation. Elements of this embodiment having the same function as that illustrated in FIGS. 1A–3 are given the same reference numerals.
Figure 4B:
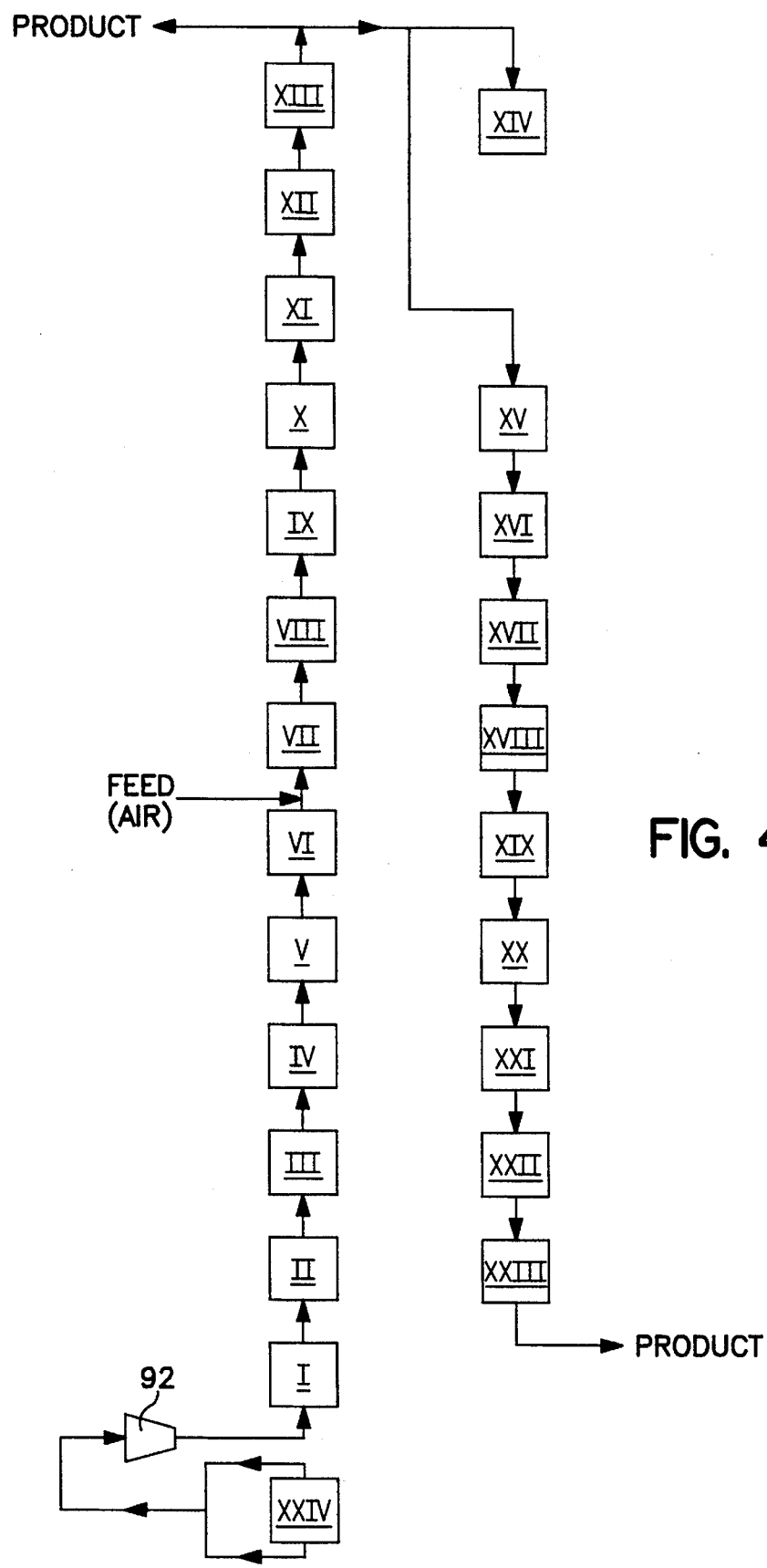
FIG. 4B is a process flow diagram of the apparatus of FIG. 4A illustrating the phase of operation shown in FIG. 4A.

With reference to FIGS. 4A and 4B an apparatus 90 is illustrated which forms an alternative embodiment of the present invention. In apparatus 90, rotary portion 20 of rotary valve rotates in the clockwise direction. Inlet 30 is separated from outlet 32 by five sets of upper portions 78 and 86 of inlets and outlets 22 and 24. As in the previous embodiment purge throttle valve 38 and vent 40 is separated by seven pairs of upper portions 78 and 86 of inlets and outlets 22 and 24 to allow nine sections of adsorbent to be subjected to regeneration. Going clockwise, after six sets of upper portions 78 and 86 of inlets and outlets 22 and 24, past inlet 30, a vacuum pump 92 is connected across a set of upper portions 78 and 86 of an inlet 22 and an outlet 24 that are located adjacent vent 40. An outlet 94 of vacuum pump 92 is connected across upper portions 78 and 86 of the seventh pair of inlets and outlets 22 and 24 past inlet 30 as viewed in the counter clockwise direction. In operation, vacuum pump 92 subjects the most saturated section of adsorbent to a vacuum to desorb the more preferentially adsorbed component, in the illustrated embodiment, nitrogen, and purge six of the first sections with a purge flow (containing nitrogen) before inlet 30. The effect of this purge is to drive oxygen off the adsorbent and towards inlet 30 and eventually outlet 32. At the same time, a low pressure product, nitrogen is able to be delivered from vent 40.

Therefore, in the instant shown in FIGS. 4A and 4B, the first portion of adsorbent are formed by sections I–XIII and XXIV with section XIII having the lowest concentration of the more preferentially adsorbed component and section XXIV having the highest concentration of the more preferentially adsorbed component. Air is being introduced into an intermediate section, section VII, and the highly enriched product is being expelled from section XIII, the section having the lowest concentration of the more preferentially adsorbed component nitrogen. The purge flow emanating from section XXIV drives oxygen in the direction of sections VII and XIII. At the same time, section XIV, which was a regenerated section in a previous phase, is being backfilled and sections XV through XXIII are being purged with product gas so as to form a regenerated section XV and a non-regenerated section XXIII.

Figure 5A:
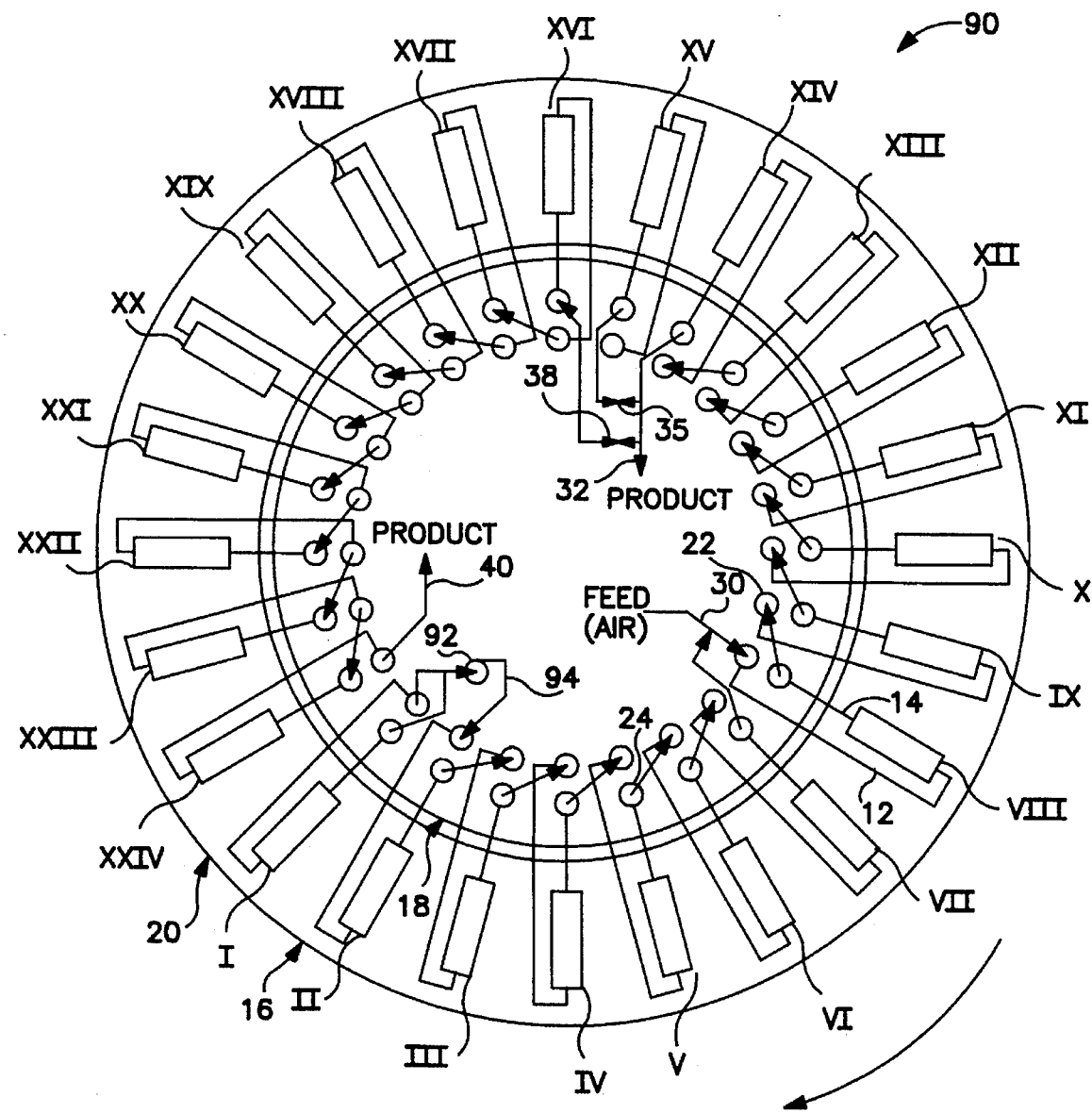
FIG. 5A is a schematic plan view of the apparatus of FIG. 4A showing a phase of operation that directly follows the phase of operation shown in FIG. 4A.
Figure 5B:
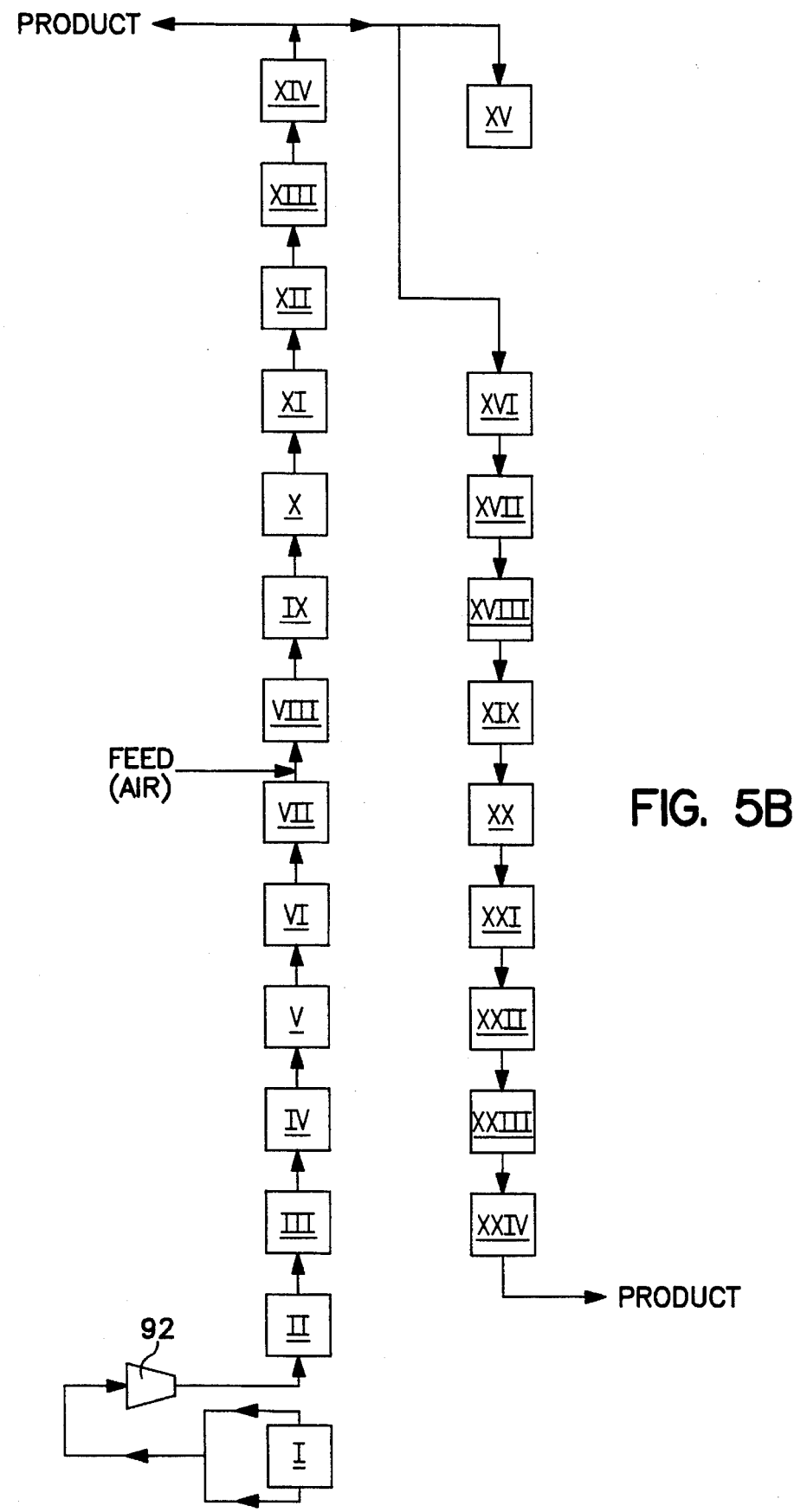
FIG. 5B is a process flow diagram of the apparatus as shown in FIG. 5A illustrating the phase of operation of the apparatus occurring in FIG. 5A.

With reference to FIGS. 5A and 5B, rotary portion 20 of rotary valve 16 and therefore the beds or sections have rotated clockwise the distance of one pair of inlets and outlets 22 and 24. Section XXIV has been transferred from the first portion to the second portion of adsorbent and forms a non-regenerated section thereof. Section I has the highest concentration of the more preferentially adsorbed component while section XIV which was regenerated has now been transferred to the first portion of adsorbent and is now the least concentrated of the first sections of adsorbent. Section XVI which has been regenerated is being backfilled for eventual transfer to the first portion of adsorbent.

The following is an example which illustrates the operation and performance of the process. All performance data quoted were taken from laboratory results obtained using a bench scale unit whose construction and operation is substantially the same as apparatus 90 shown in FIGS. 4A and 5A with some modification. In the modification, rotary valve 16 was set up so that the adsorbent between inlet 30 and outlet 32 consisted of eight adsorbent beds and the adsorbent between inlet 30 and vacuum pump 92 consisted of five adsorbent beds. An additional vacuum pump was connected to vent 40. In this bench scale test unit, each bed forming a section utilized 42 grams of adsorbent, a NaX zeolite, type PS02-HP manufactured by UOP Corporation, 50 East Algonquin Road, Des Plaines, Ill. 60017.

In the example, dry air at about 28° C. and 1.63 atmospheres was supplied to the process at the rate of 2.55 standard liters per minute (slpm). The high pressure product obtained was an oxygen-rich stream (88.4% oxygen, 7.7% nitrogen and 3.9% argon) which was withdrawn from the process at the rate of 0.59 slpm and a pressure of 1.5 atmospheres. A low pressure product stream (99.3% nitrogen, 0.7% oxygen and <0.1% argon) was withdrawn from vent 40 at the rate of 1.96 slpm and a pressure of 0.47 atmospheres by means of the additional vacuum pump. Vacuum pump 92 operated to supply a purge flow toward inlet 30 at the rate of 9.1 slpm. The flow through purge inlet 38 was maintained at 1.49 slpm. During the process, the rotary valve 16 rotated at the rate of 0.588 rpm, to maintain a full cycle time for the process of 102 seconds.

It has been computed by the inventors herein that a conventional pressure difference driven adsorption process using 1.008 kg of adsorbent (the amount of adsorbent used in the example) to produce oxygen would produce no more than 50% of the oxygen produced in the example process (given above) due to the lack of sectioning of the adsorbent.

While the invention has been described with reference to preferred embodiments, it will be understood by those skilled in the art that numerous additions, changes and omissions may be made without departing from the spirit and scope of the present invention.

We claim:

1. A method of separating a multi-component gaseous mixture comprising:

passing the multi-component gaseous mixture through a first portion of an adsorbent at a sufficiently high pressure to adsorb at least one more preferentially adsorbed component of the multi-component gaseous mixture;

regenerating a second portion of said adsorbent at a sufficiently low partial pressure of said at least one more preferentially adsorbed component to desorb the at least one more preferentially adsorbed component from said adsorbent;

said multi-component gaseous mixture being passed through said first portion of the adsorbent and said second portion of said adsorbent being subjected to said sufficiently low partial pressure in discrete sections of said adsorbent making up said first and second portions of the adsorbent so that the sections forming said first portion of said adsorbent become successively less saturated with the at least one more preferentially adsorbed component as said multi-component mixture passes through said first portion of said adsorbent to form least and most saturated sections and so that the sections of adsorbent forming said second portion of the adsorbent become successively more concentrated in said at least one more preferentially adsorbed component to form regenerated and non-regenerated sections;

expelling a product stream enriched with at least one less preferentially adsorbed component of said multi-component mixture from said least saturated section; and said second portion of said adsorbent being subjected to said sufficiently low partial pressure by introducing a purge stream, enriched with said at least one less preferentially adsorbed component of said multi-component mixture, to said regenerated section and such that purge stream is expelled as waste from said non-regenerated section;

continually and simultaneously shifting masses of said adsorbent between said first and second portions of said adsorbent so that the adsorbent forming said regenerated section is shifted to said first portion of said adsorbent and used to form said least saturated sections and so that the adsorbent forming said most saturated section is shifted to said second portion of said adsorbent and used to form said non-regenerated section;

the continual and simultaneous shifting of the masses of said adsorbent being made to occur at a sufficient frequency to maintain the sections forming the first and second portions of the adsorbent successively less saturated and successively more concentrated, respectively, in the more preferentially adsorbed components.

2. The method of claim 1, wherein the said first portion of adsorbent is divided into a sufficient number of said sections that the adsorbent forming said first portion of adsorbent is more saturated with said at least one more preferentially adsorbed component than had said first portion of the adsorbent not been so divided.

3. The method of claim 1, further comprising:

repressurizing said regenerated section with a subsidiary stream formed from another part of said product stream during the shift of said regenerated section from said second to said first portion of said adsorbent so that said regenerated section is brought up to said sufficiently high pressure; and depressurizing said most saturated sections to a reduced pressure, below said sufficiently high pressure, during the shift of said most saturated section from said first to said second portion of said adsorbent to initiate desorption of said more preferentially adsorbed component.

4. The method of claim 3, wherein:

said multi-component gaseous mixture is passed through said first portion of said adsorbent by introducing said multi-component gaseous mixture into said most saturated section;

said subsidiary stream comprises a first subsidiary stream composed of said part of said product stream; and said purge stream comprises a second subsidiary stream composed of said product stream.

5. The method of claim 3, wherein:

said sections of said first and second portions of the adsorbent include intermediate sections which have concentrations of said at least one more preferentially adsorbed component between those of said least and most saturated sections of the first portion of the adsorbent and between those of said regenerated and non-regenerated sections; and the intermediate sections of said first and second portions of said adsorbent are at least in part formed from the adsorbent forming said least saturated section and said non-regenerated section prior to the shifts of the masses of the adsorbent forming said regenerated and most saturated sections.

6. The method of claim 5, wherein:

said multi-component gaseous mixture is passed through said first portion of said adsorbent by introducing said multi-component gaseous mixture into said most saturated section;

said subsidiary stream comprises a first subsidiary stream composed of said part of said product stream; and said purge stream comprises a second subsidiary stream composed of said part of said product stream.

7. The method of claim 6, wherein the said first portion of adsorbent is divided into a sufficient number of said sections that the adsorbent forming said first portion of adsorbent is more saturated with said at least one more preferentially adsorbed component than had said first portion of the adsorbent not been so divided.

8. The method of claim 6 wherein:

said multi-component gaseous mixture comprises air; and said most saturated section is depressurized through venting to atmosphere.

9. The method of claim 6, wherein:

said multi-component gaseous mixture comprises air;

said at least one more preferentially adsorbed component comprises nitrogen; and said at least one less preferentially adsorbed component comprises oxygen.

10. The method of claim 1, wherein:

said sections of said first and second portions of the adsorbent include intermediate sections which have concentrations of said at least one more preferentially adsorbed component between those of said least and most saturated sections of the first portion of the adsorbent and between those of said regenerated and non-regenerated sections; and the intermediate sections of said first and second portions of said adsorbent are at least in part formed from the adsorbent forming said least saturated section and said non-regenerated section prior to the shifts of the masses of the adsorbent forming said regenerated and most saturated sections.

11. The method of claim 10, wherein:

said multi-component gaseous mixture is passed through said first portion of said adsorbent by introducing said multi-component gaseous mixture into one of the intermediate sections thereof having a concentration of said at least one more preferably adsorbed component that is intermediate that of said most and least saturated sections;

said most saturated section is subjected to a sufficiently low pressure such that said at least one more preferentially adsorbed component desorbs; and said at least one more preferentially adsorbed component desorbed from said most saturated section is driven through said first portion of said adsorbent, towards said one intermediate section to in turn drive the at least one less preferentially adsorbed component towards said least saturated section.

12. The method of claim 11, further comprising repressurizing said regenerated section with a subsidiary stream formed from part of said product stream during the shift of said regenerated section from said second to said first portion of said adsorbent so that said regenerated section is brought up to said sufficiently high pressure.

13. The method of claim 12, wherein:

said subsidiary stream comprises a first subsidiary stream composed of said part of said product stream; and said purge stream comprises a second subsidiary stream composed of said part of said product stream.

14. The method of claim 13, wherein the said first portion of adsorbent is divided into a sufficient number of said sections that the adsorbent forming said first portion of adsorbent is more saturated with said at least one more preferentially adsorbed component than had said first portion of the adsorbent not been so divided.

15. The method of claim 14, wherein:

said multi-component gaseous mixture comprises air;

said at least one more preferentially adsorbed component comprises nitrogen; and said at least one less preferentially adsorbed component comprises oxygen.

* * * * *